(12) United States Patent
Boehm

(10) Patent No.: US 12,127,084 B2
(45) Date of Patent: *Oct. 22, 2024

(54) ACCESSING A MEMORY RESOURCE AT ONE OR MORE PHYSICALLY REMOTE ENTITIES

(71) Applicant: Lodestar Licensing Group LLC, Evanston, IL (US)

(72) Inventor: Aaron P. Boehm, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,515

(22) Filed: Oct. 16, 2023

(65) Prior Publication Data

US 2024/0040351 A1     Feb. 1, 2024

Related U.S. Application Data

(60) Division of application No. 17/542,691, filed on Dec. 6, 2021, now Pat. No. 11,792,624, which is a
(Continued)

(51) Int. Cl.
*H04L 67/12* (2022.01)
*H04L 67/04* (2022.01)
(Continued)

(52) U.S. Cl.
CPC .............. *H04W 4/44* (2018.02); *H04L 67/04* (2013.01); *H04L 67/12* (2013.01); *H04B 1/38* (2013.01); *H04W 88/08* (2013.01)

(58) Field of Classification Search
CPC .......... H04W 4/44; H04L 67/04; H04L 67/12; H04B 1/38
See application file for complete search history.

(56) References Cited

U.S. PATENT DOCUMENTS 7,917,599 B1    3/2011  Gopalan et al.
8,306,525 B2   11/2012  Feher
(Continued)

FOREIGN PATENT DOCUMENTS

DE       102017008956 A1     3/2018
EP            2677720 A1    12/2013
KR     10-2015-0012309 A     2/2015

OTHER PUBLICATIONS

Choi, et al. "A Remote Memory System for High Performance Data Processing", International Journal of Future Computer and Communications, vol. 4, No. 1, Feb. 2015, 5 pp.
(Continued)

*Primary Examiner* — Philip C Lee
(74) *Attorney, Agent, or Firm* — Brooks, Cameron & Huebsch, PLLC

(57) ABSTRACT

Apparatuses, systems, and methods related to accessing a memory resource at one or more physically remote entities are described. A system accessing a memory resource at one or more physically remote entities may enable performance of functions, including automated functions critical for prevention of damage to a product, personnel safety, and/or reliable operation, based on increased access to data that may improve performance of a mission profile. For instance, one apparatus described herein includes a first vehicle configured to determine that a processing capability or a memory capacity, or both, at the first vehicle is insufficient to perform a processing operation at the first vehicle, identify additional processing resources or additional memory capacity, or both, at a second vehicle that is in wireless communication with the first vehicle based at least in part on determining that the processing capability or the memory capacity, or both, at the first vehicle is insufficient, and perform the processing operation at the first vehicle using
(Continued)

the additional processing resources or the additional memory capacity, or both.

20 Claims, 4 Drawing Sheets

Related U.S. Application Data continuation of application No. 16/142,172, filed on Sep. 26, 2018, now Pat. No. 11,197,136.

(51) Int. Cl.
*H04W 4/44* (2018.01)
*H04B 1/38* (2015.01)
*H04W 88/08* (2009.01)

(56) References Cited

U.S. PATENT DOCUMENTS

| | | |
|---|---|---|
| 9,497,572 B2 | 11/2016 | Britt et al. |
| 2003/0028672 A1 | 2/2003 | Goldstein |
| 2009/0144388 A1 | 6/2009 | Gross et al. |
| 2009/0239480 A1 | 9/2009 | Rofougaran et al. |
| 2011/0038378 A1 | 2/2011 | Carter |
| 2012/0208508 A1 | 8/2012 | Shah |
| 2014/0344595 A1 | 11/2014 | Jenne |
| 2015/0112507 A1 | 4/2015 | Loewel et al. |
| 2017/0332352 A1 | 11/2017 | Sheng |
| 2018/0234889 A1 | 8/2018 | Baghel et al. |
| 2018/0241810 A1 | 8/2018 | Lerzer et al. |
| 2018/0300964 A1 | 10/2018 | Lakshamanan |
| 2019/0098602 A1 | 3/2019 | Costa |
| 2019/0354412 A1 | 11/2019 | Bivens |
| 2020/0019445 A1 | 1/2020 | Altintas |
| 2020/0084193 A1 | 3/2020 | Beaurepaire |
| 2021/0094436 A1 | 4/2021 | Weber |

OTHER PUBLICATIONS

"5G Network Architecture—A High-Level Perspective" Huawei Technologies, Co., Ltd., Bantian Longgang District, Shenzhen, China, 2016, 21 pp.

International Search Report and Written Opinion from related international application No. PCT/US2019/052342, dated Jan. 15, 2020, 11 pages.

Extended European Search Report from related European Patent Application No. 19866566.3, dated May 24, 2022, 7 pages.

ACCESSING A MEMORY RESOURCE AT ONE OR MORE PHYSICALLY REMOTE ENTITIES

PRIORITY INFORMATION

This application is a Divisional of U.S. application Ser. No. 17/542,691, filed on Dec. 6, 2021, which is a Continuation of U.S. application Ser. No. 16/142,172, filed on Sep. 26, 2018, and now issued as U.S. Pat. No. 11,197,136 on Dec. 7, 2021, the contents of which are incorporated herein by reference.

TECHNICAL FIELD

The present disclosure relates generally to semiconductor memory and methods, and more particularly, to apparatuses and methods related to accessing a memory resource at one or more physically remote entities.

BACKGROUND

In conventional motor vehicles (e.g., automobiles, cars, trucks, buses, etc.), the driver is critical to operating the vehicle's control system. For example, the driver of a conventional motor vehicle makes decisions regarding the safe operation of the vehicle. Such decisions may include decisions related to the speed of the vehicle, steering of the vehicle, obstacle and/or hazard recognition, and obstacle and/or hazard avoidance. However, a driver's ability to make these decisions and operate the vehicle's control system may be limited in some situations. For example, driver impairment, fatigue, attentiveness, and/or other factors such as visibility (e.g., due to weather or changes in terrain) may limit a driver's ability to safely operate a conventional motor vehicle and/or its control system.

In order to alleviate the deficiencies resulting from driver operation of a conventional motor vehicle, various manufacturers have experimented with autonomous vehicles. While autonomous vehicles may allow for a reduction in issues that may arise as a result of the driver's ability to operate the conventional motor vehicle becoming lessened, autonomous vehicles have their own shortcomings.

For example, autonomous vehicles may rely on artificial intelligence and/or machine learning. Artificial intelligence and machine learning require large amounts of memory bandwidth, which can be difficult to achieve given the constraints of I/O technology, power, and packaging. For example, concerning power, thermal management and battery life must be considered. For safety, system components in autonomous vehicles need to be reliable because failure of one or more system components could result in injury or death to passengers in the autonomous vehicle. To decrease the chance of system failure, system components can be reduced, however a lower component count is generally in conflict with meeting performance requirements of the system.

DETAILED DESCRIPTION

Figure 1:
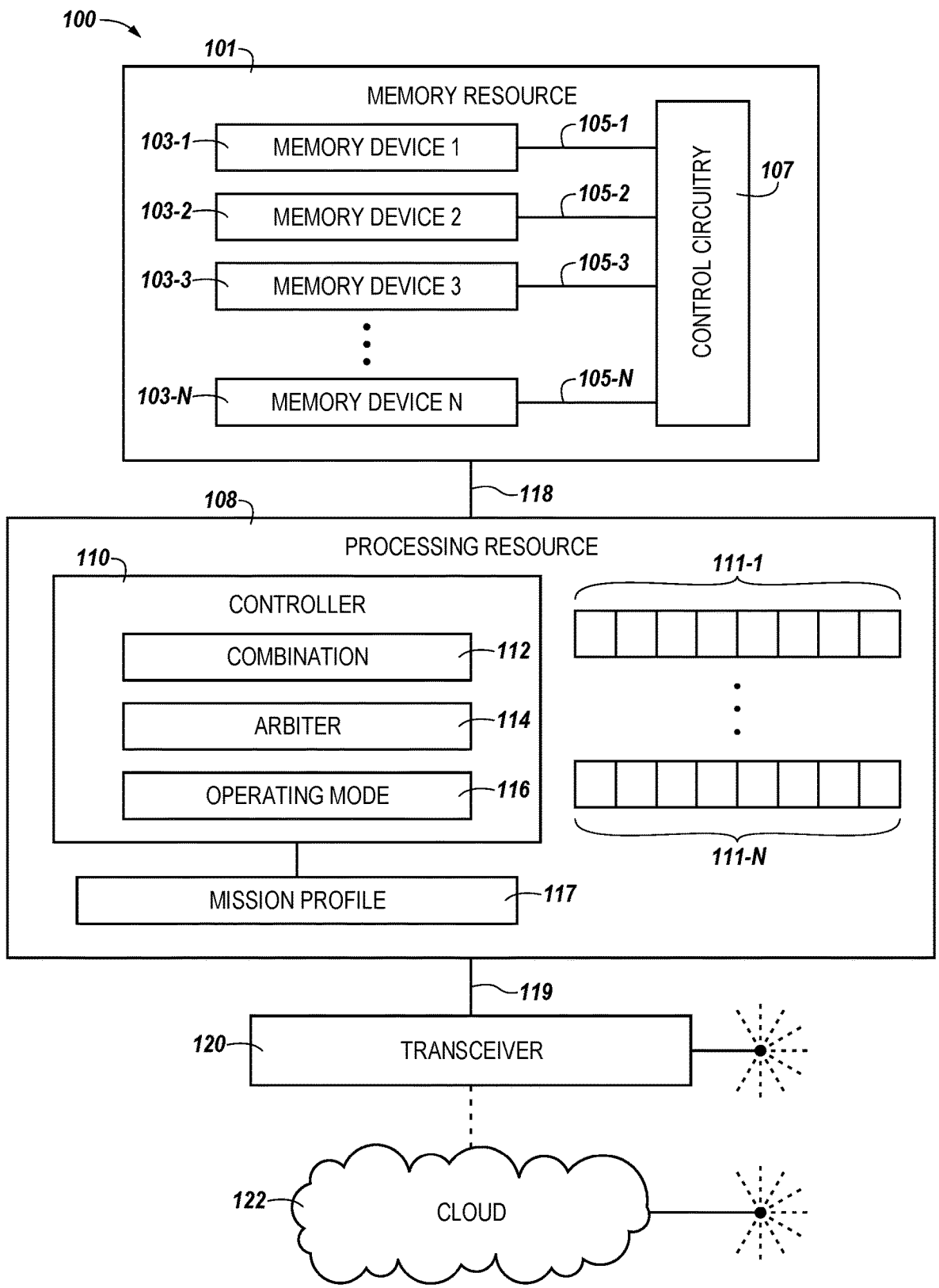
FIG. 1 is a block diagram of an apparatus in the form of a memory resource and processing resource in accordance with a number of embodiments of the present disclosure.

The present disclosure includes apparatuses and methods related to accessing a memory resource at one or more physically remote entities. An example apparatus comprises a first vehicle configured to determine that a processing capability or a memory capacity, or both, at the first vehicle is insufficient to perform a processing operation at the first vehicle, identify additional processing resources or additional memory capacity, or both, at a remote entity, e.g., a second vehicle, that is in wireless communication with the first vehicle based at least in part on determining that the processing capability or the memory capacity, or both, at the first vehicle is insufficient, and perform the processing operation at the first vehicle using the additional processing resources or the additional memory capacity, or both.

In some approaches, the apparatus may further comprise a transceiver coupled to the first vehicle. A request to use the additional processing resource or the additional memory capacity, or both can be sent by the first vehicle to the second vehicle using the transceiver. Also, the access to use the additional processing resource or the additional memory capacity, or both can be received by the transceiver. In some examples, the transceiver can be a radio frequency (RF) transceiver, for example.

In some embodiments, identifying additional processing resources or additional memory capacity, or both, at the second vehicle can include the first vehicle querying the second vehicle for the additional processing resources or the additional memory capacity, or both. The request can also include an address of the first vehicle. In some examples, the first vehicle identifies additional processing resources or additional memory capacity, or both, at the second vehicle responsive to the second vehicle being the closest vehicle in proximity to the first vehicle. A number of vehicles can be queried.

The first vehicle can query a third vehicle. For example, the first vehicle can query the third vehicle for an amount of additional processing resources or additional memory capacity, or both. The first vehicle can query the third vehicle in response to the second vehicle having less processing resources or memory capacity, or both than needed to perform the operation. In some examples, the first vehicle can use the additional processing resources or the additional memory capacity, or both of the second vehicle and the third vehicle to perform the operation.

In some embodiments, the first vehicle can relinquish access to the second vehicle. For example, the first vehicle can relinquish access to the second vehicle in response to determining that the processing capability or the memory capacity, or both, at the first vehicle is sufficient to perform a different processing operation. In some examples, the first vehicle can relinquish access to the second vehicle in response to receiving an indication that additional processing resources or memory capacity, or both, at a third vehicle is available for access by the first vehicle. In some examples, the first vehicle can use the additional processing resources or memory capacity, or both, at the third vehicle.

A first memory resource and a first processing resource can be in the first vehicle and a number of memory resources can be in a number of vehicles. For example, a second memory resource can be in a second vehicle making the second memory resource a wireless memory when accessed by the first processing resource in a first vehicle. The number of memory resources can be queried and/or used by an active vehicle and the number of memory resources can be from and/or connected to idle vehicles. For example, a vehicle in use (e.g., driving and/or turned on) can use the memory resources of vehicles that are not in use (e.g., parked and/or turned off). The number of memory resources can be within a particular proximity to the active vehicle. In some examples, the number of memory resources can each grant access to the number of memory resources in response to none of the number of memory resource having a particular amount of memory available.

The figures herein follow a numbering convention in which the first digit or digits correspond to the drawing figure number and the remaining digits identify an element or component in the drawing. Similar elements or components between different figures may be identified by the use of similar digits. For example, 108 may reference element "8" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus 100 in the form of a memory resource 101 and a processing resource 108 in accordance with a number of embodiments of the present disclosure. The apparatus 100 can include a wirelessly utilizable resource.

As shown in FIG. 1, apparatus 100 includes a memory resource 101 coupled to a processing resource 108, a transceiver 120, and a cloud 122. The memory resource 101 can include a number of memory devices 103-1, 103-2, . . . , 103-N coupled to control circuitry 107 via a number of channels 105-1, 105-2, . . . , 105-N. The processing resource 108 can include a controller 110 and a mission profile 117. The controller 110 can include a combination 112, an arbiter 114, and an operating mode 116.

The memory resource 101 may include memory (e.g., memory cells) arranged, for example, in a number of bank groups, banks, bank sections, subarrays, and/or rows of a number of memory devices 103-1, 103-2, . . . , 103-N.

The memory resource 101 may include volatile and/or non-volatile memory configured to store instructions executable by the processing resource 108 coupled to the memory resource 101 via bus 118. For example, the number of memory devices 103-1, 103-2, . . . , 103-N may include flash memory, for example NOR, read-only memory (ROM), programmable read-only memory (PROM), erasable programmable read-only memory (EPROM), electrically erasable programmable read-only memory (EEPROM), dynamic random-access memory (DRAM), static random-access memory (SRAM), and/or other suitable storage media.

In some embodiments, the memory resource 101 may include a number of non-volatile memory devices formed and/or operable as PCRAM, RRAM, FeRAM, MRAM, and/or STT RAM, phase change memory, 3D XPoint, and/or Flash memory devices, among other types of non-volatile memory devices. In some embodiments, the memory resource 101 of FIG. 1 may include a combination of a number of volatile memory devices and a number of non-volatile memory devices, as described herein.

Each of the number of memory devices 103-1, 103-2, . . . , 103-N can be coupled to a corresponding number of channels 105-1, 105-2, . . . , 105-N. The number of channels 105-1, 105-2, . . . , 105-N are described further in connection with FIG. 2. The number of channels 105-1, 105-2, . . . , 105-N can be selectably coupled to control circuitry 107 of the memory resource 101. The control circuitry 107 can be configured to enable data values for and/or instructions (e.g., commands) related to an operation to be directed to an appropriate one or more of the number of memory devices 103-1, 103-2, . . . , 103-N.

The apparatus 100 may be used in autonomous driving applications. For example, the memory resource 101, processing resource 108, and/or the transceiver 120 can be, but is not limited to being located on an autonomous vehicle. The number of memory devices 103-1, 103-2, . . . , 103-N of the memory resource 101 may store vehicle data. For example, critical code (e.g., firmware, specific parameters, and data) for an autonomous driving application. The data can include data collected from vehicle sensors, photographic data collected from vehicle cameras, and/or a combination thereof. In some embodiments the memory resource 101 can store data and transmit data. The data can be transmitted to the processing resource 108 including the controller 110.

The processing resource 108 can receive data and/or instructions from the memory resource 101 via a bus 118. The bus 118 can include a number of I/O lines selectably coupled to the channels 105-1, 105-2, . . . , 105-N via switches (e.g., switches 226-1, . . . , 226-N in FIG. 2). The received data can be used by the controller 110 to generate commands. For example, the data can include information regarding the amount of memory needed to perform an operation. The controller 110 can generate a command to request access to another memory resource, for example. The processing resource 108 can then transmit the request to a transceiver 120 via channel 119 to send the request to one more processing resources and/or memory resources. In some embodiments, the transceiver 120 can send the request to the cloud 122 to query the one or more processing resources.

In some embodiments, the controller 110 can include a number of components configured to contribute to operations controlled by the controller 110. Such components may include a combination component 112, an arbiter component 114, and an operating mode component 116. The combination component 112 can be configured to assess resource availability in a plurality of separate memory devices 101. The arbiter component 114 can be configured to selectably determine whether a first processing resource is authorized to access a second memory resource. The operating mode component 116 can be configured to determine a particular number of second memory resources to be used by a first processing resource.

The processing resource 108 can include a mission profile 117. The mission profile 117 can be selectably coupled to the controller 110 and or the combination component 112, the arbiter component 114, and the operating mode component 116 associated with the controller 110. The mission profile 117 can be stored and/or accessible in SRAM of the processing resource 108, for example. The mission profile 117 can alternatively or in addition be stored by the memory resource 101 by one or more of the number of memory devices 103-1, 103-2, ..., 103-N and can be accessible via bus 118, control circuitry 107, and/or channels 105-1, 105-2, ..., 105-N by the controller 110 for read and/or write operations.

As shown in FIG. 1, the processing resource 108 includes a plurality of sets of logic units 111-1, ..., 111-N (collectively referred to as logic units 111). In a number of embodiments, the processing resource 108 may be configured to execute a plurality of sets of instructions using the plurality of sets of logic units 111-1, ..., 111-N and transmit outputs obtained as a result of the execution via a device-to-device communication technology that is operable in a number of frequency bands including the EHF band. The outputs transmitted may be communicated with other devices such as wirelessly utilizable resources (e.g., wirelessly utilizable resources 200-1, ..., 200-4.

Although embodiments are not so limited, at least one of the logic units 111 can be an arithmetic logic unit (ALU), which is a circuit that can perform arithmetic and bitwise logic operations on integer binary numbers and/or floating point numbers. As an example, the ALU can be utilized to execute instructions by performing logical operations such as AND, OR, NOT, NAND, NOR, and XOR, and invert (e.g., inversion) logical operations on data (e.g., one or more operands). The processing resource 108 may also include other components that may be utilized for controlling logic units 111. For example, the processing resource 108 may also include a control logic (e.g., configured to control a data flow coming into and out of the logic units 111) and/or a cache coupled to each of the plurality of set of logic units 111-1, ..., 111-N.

A number of ALUs can be used to function as a floating point unit (FPU) and/or a graphics processing unit (GPU). Stated differently, at least one of the plurality of sets of logic units 111-1, ..., 111-N may be FPU and/or GPU. As an example, the set of logic units 111-1 may be the FPU while the set of logic units 111-N may be the GPU.

As used herein, "FPU" refers to a specialized electronic circuit that operates on floating point numbers. In a number of embodiments, FPU can perform various operations such as addition, subtraction, multiplication, division, square root, and/or bit-shifting, although embodiments are not so limited. As used herein, "GPU" refers to a specialized electronic circuit that rapidly manipulate and alter memory (e.g., memory resource 101) to accelerate the creation of image in a frame buffer intended for output to a display. In a number of embodiments, GPU can include a number of logical operations on floating point numbers such that the GPU can perform, for example, a number of floating point operations in parallel.

In some embodiments, GPU can provide non-graphical operation. As an example, GPU can also be used to support shading, which is associated with manipulating vertices and textures with man of the same operations supported by CPUs, oversampling and interpolation techniques to reduce aliasing, and/or high-precision color spaces. These example operations that can be provided by the GPU are also associated with matrix and vector computations, which can be provided by GPU as non-graphical operations. As an example, GPU can also be used for computations associated with performing machine-learning algorithms and is capable of providing faster performance than what CPU is capable of providing. For example, in training a deep learning neural networks, GPUs can be 250 times faster than CPUs. As used herein, "machine-learning algorithms" refers to algorithms that uses statistical techniques to provide computing systems an ability to learn (e.g., progressively improve performance on a specific function) with data, without being explicitly programmed.

GPU can be present on various locations. For example, the GPU can be internal to (e.g., within) the CPU (e.g., of the network device 102). For example, the GPU can be on a same board (e.g., on-board unit) with the CPU without necessarily being internal to the GPU. For example, the GPU can be on a video card that is external to a wirelessly utilizable resource (e.g., wirelessly utilizable resource 200-1, ..., 200-4 as described in connection with FIG. 2). Accordingly, the apparatus 100 may be an additional video card that can be external to and wirelessly coupled to a network device such as the wirelessly utilizable resource for graphical and/or non-graphical operations.

A number of GPUs of the processing resource 108 may accelerate a video decoding process. As an example, the video decoding process that can be accelerated by the processing resource 108 may include a motion compensation (mocomp), an inverse discrete cosine transform (iCDT), an inverse modified discrete cosine transform (iMDCT), an in-loop deblocking filter, an intra-frame prediction, an inverse quantization (IQ), a variable-length decoding (VLD), which is also referred to as a slice-level acceleration, a spatial-temporal deinterlacing, an automatic interlace/progressive source detection, a bitstream processing (e.g., context-adaptive variable-length coding and/or context-adaptive binary arithmetic coding), and/or a perfect pixel positioning. As used herein, "a video decoding" refers to a process of converting base-band and/or analog video signals to digital components video (e.g., raw digital video signal).

In some embodiments, the processing resource 108 may be further configured to perform a video encoding process, which converts digital video signals to analog video signals. For example, if the network device (including a display) requests the apparatus 100 to return a specific form of signals such as the analog video signals, the apparatus 100 may be configured to convert, via the processing resource 108, digital video signals to analog video signals prior to transmitting those wirelessly to the network device.

The apparatus 100 includes the transceiver 120. As used herein, a "transceiver" may be referred to as a device including both a transmitter and a receiver. In a number of embodiments, the transceiver 120 may be and/or include a number of radio frequency (RF) transceivers. The transmitter and receiver may, in a number of embodiments, be combined and/or share common circuitry. In a number of embodiments, no circuitry may be common between the transmit and receive functions and the device may be termed a transmitter-receiver. Other devices consistent with the present disclosure may include transponders, transverters, and/or repeaters, among similar devices.

In a number of embodiments, a communication technology that the processing resource 108 can utilize may be a device-to-device communication technology as well as a cellular telecommunication technology, and the processing resource 108 may be configured to utilize the same transceiver 120 for both technologies, which may provide various benefits such as reducing a design complexity of the apparatus 100. As an example, consider devices (e.g., wirelessly utilizable resources 200-1, ..., 200-4 and/or any other devices that may be analogous to the apparatus 100) in previous approaches, in which the device utilizes a device-to-device communication technology as well as a cellular telecommunication technology in communicating with other devices. The device in those previous approaches may include at least two different transceivers (e.g., each for the device-to-device communication technology and the cellular telecommunication technology, respectively) because each type of communication technology may utilize different network protocols that would further necessarily utilize unique transceivers. As such, the device implemented with different transceivers would increase a design (e.g., structural) complexity that may increase costs associated with the device. On the other hand, in a number of embodiments, the processing resource 108 is configured to utilize the same network protocol for both technologies (e.g., device-to-device communication and cellular telecommunication technologies), which eliminates a need of having different transceivers for different types of wireless communication technologies. Accordingly, a number of the present disclosure may reduce a design complexity of the apparatus 100.

In a number of embodiments, since resources of the apparatus 100 can be wirelessly utilizable, the apparatus 100 may be free of those physical interfaces that would have been included, to physically connect to a motherboard of a network device and/or a display, in expansion cards of previous approaches. For example, the apparatus 100 as an expansion card may not include a physical interface, which would have been utilized to connect to the mother board, such as a physical bus (e.g., S-100 bus, industry standard architecture (ISA) bus, NuBus bus, Micro Channel bus (or Micro Channel Architecture (MCA), extended industry standard architecture (EISA) bus, VESA local bus (VLB), peripheral component interconnect (PCI) bus, ultra port architecture (UPA), universal serial bus (USB), peripheral component interconnect extended (PCI-X), peripheral component interconnect express (PCIe)) or other physical channels such as accelerated graphics port (AGP) that would have been utilized to connect to the motherboard. For example, the apparatus 100 as an expansion card may not include a physical interface, which would have been utilized to connect to the display, such as a video graphics array (VGA), digital video interface (DVI), high-definition multimedia interface (HDMI), and/or display port. Accordingly, the apparatus 100 may be configured to transmit, via the transceiver 120, those signals, which would have been transmitted by those physical interfaces listed above, wirelessly to the network device and/or display. For example, the signals that can be wirelessly transmitted via the transceiver 120 may include compressed and/or uncompressed digital video signals (that would have been transmitted by HDMI and/or VGA), compressed and/or uncompressed audio signals (that would have been transmitted by HDMI), and/or analog video signals (that would have been transmitted by VGA).

Figure 2:
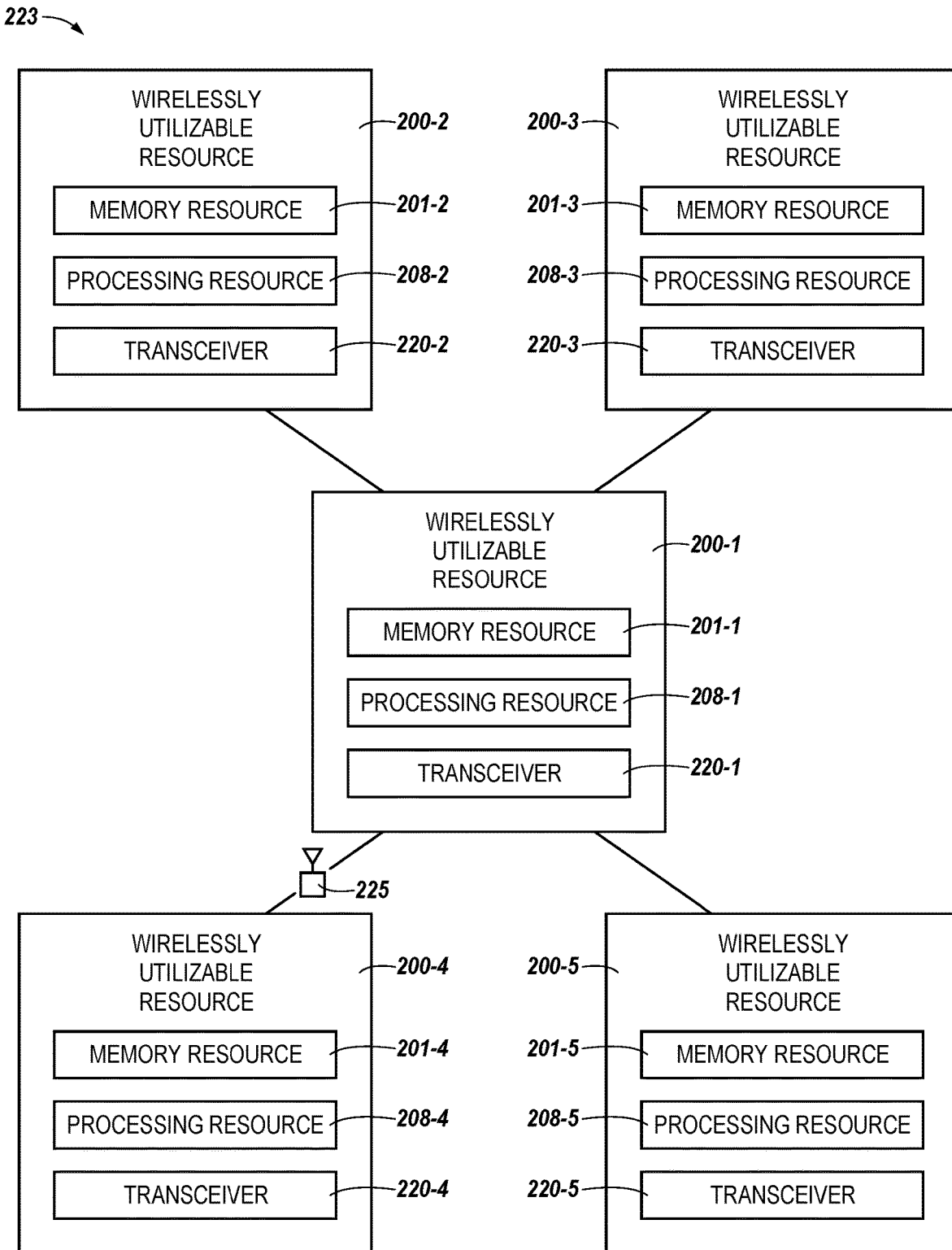
FIG. 2 is a block diagram of examples of a system including an apparatus in accordance with a number of embodiments of the present disclosure.

Further, the apparatus 100 may be utilized by wirelessly utilizable resource (e.g., wirelessly utilizable resource 200-1, . . . , 200-4 in FIG. 2) via a device-to-device communication technology that is operable in an EHF band. The communication technology operable in the EHF band can include a fifth generation (5G) technology or later technology. 5G technology may be designed to utilize a higher frequency portion of the wireless spectrum, including an EHF band (e.g., ranging from 30 to 300 GHz as designated by the ITU).

As used herein, the device-to-device communication technology refers to a wireless communication performed directly between a transmitting device and a receiving device, as compared to a wireless communication technology such as the cellular telecommunication technology and/or those communication technologies based on an infrastructure mode, by which network devices communicate with each other by firstly going through an intermediate network device (e.g., base station and/or Access Point (AP)). As such, via the device-to-device communication technology, data to be transmitted by the transmitting device may be directly transmitted to the receiving device without routing through the intermediate network device (e.g., base station 225), as described in connection with FIG. 2). In some embodiments, the device-to-device communication may rely on existing infrastructures (e.g., network entity such as a base station); therefore, can be an infrastructure mode. For example, as described herein, the device-to-device communication whose transmission timing is scheduled by a base station can be an infrastructure mode. In some embodiments, the receiving and transmitting devices may communicate in the absence of the existing infrastructures; therefore, can be an ad-hoc mode. As used herein, "an infrastructure mode" refers to an 802.11 networking framework in which devices communicate with each other by first going through an intermediary device such as an AP. As used herein, "ad-hoc mode" refers to an 802-11 networking framework in which devices communicate with each other without the use of intermediary devices such as an AP. The term "ad-hoc mode" can also be referred to as "peer-to-peer mode" or "independent Basic Service Set (IBSS)."

As used herein, the cellular telecommunication technology refers to a technology for wireless communication performed indirectly between a transmitting device and a receiving device via a base station, as compared to those types of wireless communication technologies including a device-to-device communication technology. Cellular telecommunications may be those that use resources of a frequency spectrum restricted or regulated by a governmental entity. License frequency spectrum resources may be scheduled for use or access by certain devices and may be inaccessible to other devices. By contrast, resources of shared or unlicensed frequency spectrum may be open and available for use by many devices without the necessity of a governmental license. Allocating licensed and shared or unlicensed frequency resources may present different technical challenges. In the case of licensed frequency spectrum, resources may be controlled by a central entity, such as a base station or entity within a core network. While devices using resources of shared or unlicensed frequency spectrum may contend for access—e.g., one device may wait until a communication channel is clear or unused before transmitting on that channel. Sharing resources may allow for broader utilization at the expense of guaranteed access.

Techniques described herein may account for, or may use, both licensed and unlicensed frequency spectrum. In some communication schemes, device-to-device communication may occur on resources of a licensed frequency spectrum, and such communications may be scheduled by a network entity (e.g., a base station). Such schemes may include certain 3GPP-developed protocols, like Long-Term Evolution (LTE) or New Radio (NR). A communication link between devices (e.g. user equipments (UEs)) in such schemes may be referred to as sidelink, while a communication link from a base station to a device may be referred to as a downlink and a communication from a device to a base station may be referred to as an uplink.

In other schemes, device-to-device communication may occur on resources of unlicensed frequency spectrum, and devices may contend for access the communication channel or medium. Such schemes may include WiFi or MulteFire. Hybrid schemes, including licensed-assisted access (LAA) may also be employed.

As used herein, an EHF band refers to a band of radio frequencies in an electromagnetic spectrum ranging from 30 to 300 gigahertz (GHz) as designated by the International Telecommunication Union (ITU), and as described further herein. Ranges of radio frequencies as designated by the ITU can include extremely low frequency (ELF) band ranging from 3 to 30 Hz, super low frequency (SLF) band ranging from 30 Hz to 300 Hz, ultra low frequency (ULF) band ranging from 300 Hz to 3 kilohertz (kHz), very low frequency (VLF) band ranging from 3 to 30 kHz, low frequency (LF) band ranging from 30 kHz to 300 kHz, medium frequency (MF) band ranging from 300 kHz to 3 megahertz (MHz), high frequency (HF) band ranging from 3 MHz to 30 MHz, very high frequency (VHF) band ranging from 30 MHz to 300 MHz, ultra high frequency (UHF) band ranging from 300 MHz to 3 GHz, super high frequency (SHF) band ranging from 3 GHz to 30 GHz, extremely high frequency (EHF) band ranging from 30 GHz to 300 GHz, and tremendously high frequency (THF) band ranging from 0.3 to 3 terahertz (THz).

A number of embodiments of the present disclosure can provide various benefits by utilizing a network communication that is operable in a number of frequency bands including a higher frequency portion (e.g., EHF) of the wireless spectrum, as compared to those network communication technologies that utilizes a lower frequency portion of the wireless spectrum only. As an example, the EHF bands of 5G technology may enable data to be transferred more rapidly than technologies (e.g., including technologies of previous generations) using lower frequency bands only. For example, a 5G network is estimated to have transfer speeds up to hundreds of times faster than a 4G network, which may enable data transfer rates in a range of tens of megabits per second (MB/s) to tens of GB/s for tens of thousands of users at a time (e.g., in a memory pool, as described herein) by providing a high bandwidth. For example, a 5G network provides faster transfer rates than the 802.11-based network such as WiFi that operate on unlicensed 2.4 GHz radio frequency band (e.g., Ultra High Frequency (UHF) band). Accordingly, a number of embodiments can enable the apparatus 100 to be used at a high transfer speed as if the apparatus 100 were wired to the wirelessly utilizable resource (e.g., wirelessly utilizable resource 200-1, . . . , 200-4).

In addition to the EHF band, the communication technology of the communication can also be operable in other frequency bands such as the UHF band and the SHF band. As an example, the communication technology can operate in a frequency band below 2 GHz (e.g., low 5G frequencies) and/or in a frequency band between 2 GHz and 6 GHz (e.g., medium 5G frequencies) in addition to a frequency band above 6 GHz (e.g., high 5G frequencies). Further details of a number of frequency bands (e.g., below 6 GHz) in which the 5G technology can operate are defined in Release 15 of the Third Generation Partnership Project (3GPP) as New Radio (NR) Frequency Range 1 (FR1), as shown in Table 1.

TABLE 1

5G operating bands for FR1

| NR Operating Band | Frequency Band (MHz) | Duplex Mode |
|---|---|---|
| n1 | 1920-1980; 2110-2170 | FDD |
| n2 | 1850-1910; 1930-1990 | FDD |
| n3 | 1710-1785; 1805-1880 | FDD |
| n5 | 824-849; 869-894 | FDD |
| n7 | 2500-2570; 2620-2690 | FDD |

TABLE 1-continued 5G operating bands for FR1

| NR Operating Band | Frequency Band (MHz) | Duplex Mode |
|---|---|---|
| n8 | 880-915; 925-960 | FDD |
| n20 | 791-821; 832-862 | FDD |
| n28 | 703-748; 758-803 | FDD |
| n38 | 2570-2620 | TDD |
| n41 | 2496-2690 | TDD |
| n50 | 1432-1517 | TDD |
| n51 | 1427-1432 | TDD |
| n66 | 1710-1780; 2110-2200 | FDD |
| n70 | 1695-1710; 1995-2020 | FDD |
| n71 | 617-652; 663-698 | FDD |
| n74 | 1427-1470; 1475-1518 | FDD |
| n75 | 1432-1517 | SDL |
| n76 | 1427-1432 | SDL |
| n78 | 3300-3800 | TDD |
| n77 | 3300-4200 | TDD |
| n79 | 4400-5000 | TDD |
| n80 | 1710-1785 | SUL |
| n81 | 880-915 | SUL |
| n82 | 832-862 | SUL |
| n83 | 703-748 | SUL |
| n84 | 1920-1980 | SUL |

Further, details of a number of frequency bands (e.g., above 6 GHz) in which the 5G technology can operate are defined in Release 15 of the 3GPP as NR Frequency Range 2 (FR2), as shown in Table 2.

TABLE 2

5G operating bands for FR2

| NR Operating Band | FREQUENCY BAND (MHZ) | Duplex Mode |
|---|---|---|
| n257 | 26500-29500 | TDD |
| n258 | 24250-27500 | TDD |
| n260 | 37000-40000 | TDD |

In some embodiments, a number of frequency bands in which a communication technology (e.g., device-to-device communication technology and/or cellular telecommunication technology using 5G technology) utilized for the communication 106 may be operable can further include the THF band in addition to those frequency bands such as the SHF, UHF, and EHF bands. The memory, transceiver, and/or the processor described herein may be a resource that can be wirelessly utilizable via respective communication technologies such as 5G technology.

As used herein, FDD stands for frequency division duplex, TDD stands for time division duplex, SUL stands for supplementary uplink, and SDL stands for supplementary downlink. FDD and TDD are each a particular type of a duplex communication system. As used herein, a duplex communication system refers to a point-to point system having two connected parties and/or devices that can communicate with one another in both directions. TDD refers to duplex communication links where uplink is separated from downlink by the allocation of different time slots in the same frequency band. FDD refers to a duplex communication system, in which a transmitter and receiver operate at different frequency bands. SUL/SDL refer to a point-to-point communication system having two connected parties and/or devices that can communicate with one another in a unilateral direction (e.g., either via an uplink or a downlink, but not both).

The 5G technology may be selectively operable in one or more of low, medium, and/or high 5G frequency bands based on characteristics of, for example, the communication. As an example, the low 5G frequency may be utilized in some use cases (e.g., enhanced mobile broadband (eMBB), ultra-reliable and low-latency communications (URLLC), massive machine-type communications (mMTC)), in which extremely wide area needs to be covered by the 5G technology. As an example, the medium 5G frequency may be utilized in some use cases (e.g., eMBB, URLLC, mMTC), in which higher data rate than that of the low 5G frequencies is desired for the communication technology. As an example, the high 5G frequency may be utilized in some use cases (e.g., eMBB), in which extremely high data rate is desired for the 5G technology.

As used herein, eMBB, URLLC, mMTC each refers to one of three categories of which the ITU has defined as services that the 5G technology can provide. As defined by the ITU, eMBB aims to meet the people's demand for an increasingly digital lifestyle and focuses on services that have high requirements for bandwidth, such as high definition (HD) videos, virtual reality (VR), and augmented reality (AR). As defined by the ITU, URLLC aims to meet expectations for the demanding digital industry and focuses on latency-sensitive services, such as assisted and automated driving, and remote management. As defined by the ITU, mMTC aims to meet demands for a further developed digital society and focuses on services that include high requirements for connection density, such as smart city and smart agriculture.

As used herein, a channel bandwidth refers to a frequency range occupied by data and/or instructions when being transmitted (e.g., by an individual carrier) over a particular frequency band. As an example, a channel bandwidth of 100 MHz may indicate a frequency range from 3700 MHZ to 3800 MHZ, which can be occupied by data and/or instructions when being transmitted over n77 frequency band, as shown in Table 1. As indicated in Release 15 of the 3GPP, a number of different channel bandwidth such as a channel bandwidth equal to or greater than 50 MHz (e.g., 50 MHz, 100 MHz, 200 MHz, and/or 400 Mhz) may be utilized for the 5G technology.

Embodiments are not limited to a particular communication technology; however, various types of communication technologies may be employed for the communication. The various types of communication technologies the apparatus 100 and/or the wirelessly utilizable resource (e.g., wirelessly utilizable resource 200-1, . . . , 200-4 in FIG. 2) can utilize may include, for example, cellular telecommunication technology including 0-5 generations broadband cellular network technologies, device-to-device to communication including Bluetooth, Zigbee, and/or 5G, and/or other wireless communication utilizing an intermediary device (e.g., WiFi utilizing an AP), although embodiments are not so limited.

FIG. 2 is a block diagram of examples of a system including a number of wirelessly utilizable resources in accordance with a number of embodiments of the present disclosure. As illustrated in FIG. 2, the system 223 may, in a number of embodiments, include a plurality of elements. For example, the plurality of elements of the system 223 may be a number of wirelessly utilizable resources 200-1, . . . , 200-5 (collectively referred to as wirelessly utilizable resources 200), an apparatus 200-1, and/or a base station 225. At least a portion of the wirelessly utilizable resources 200 may include a local commodity DRAM and may utilize the resources of the apparatus 200-1 as supplemental resources. The apparatus 200-1 includes resources (e.g., a memory resource, a transceiver, and/or a processor) at least of which can be wirelessly utilizable (e.g., shared) by the wirelessly utilizable resources 200.

The wirelessly utilizable resources 200 can be various user devices. As an example, the wirelessly utilizable resources 200 can be computing devices such as laptops, phones, tablets, desktops, wearable smart devices, etc. In some embodiments, the user devices may be mobile as well. As used herein, a "mobile user device" may be a device that is portable and utilizes a portable power supply. In a number of embodiments, the wirelessly utilizable resources 200 can include a local DRAM and a memory resource that can be included in the apparatus 200-1 and utilizable by the wirelessly utilizable resources 200 and may be supplemental to the wirelessly utilizable resources 200.

The apparatus 200-1 including a wirelessly utilizable resource can be a wireless electronic component of at least one of the wirelessly utilizable resources 200. As used herein, "an electronic component" refers to an electronic component that can provide additional functions to a network device and/or assist the network device in furthering a particular function. For example, an electronic component may include various types of components (e.g., expansion card) such as a video card, sound card, primary storage devices (e.g., main memory), and/or secondary (auxiliary) storage devices (e.g., flash memory, optical discs, magnetic disk, and/or magnetic tapes), although embodiments are not so limited. As used herein, "a wireless electronic component" refers to an electronic component that is wirelessly coupled to a network device.

Accordingly, as an example, the apparatus 200-1 may be wirelessly utilized by the wirelessly utilizable resources 200 for various functions. As an example, the apparatus 200-1 may be utilized for graphical operations that would require high-performance processing and/or memory resources such as memory intensive games and/or high quality video associated with a high degree of resolutions and/or frame rates. Further, as an example, the apparatus 200-1 may be utilized for non-graphical operations such as a number of operations of applications associated with machine-learning algorithms that would require high-performance processing and/or memory resources.

In some embodiments, at least a portion of the wirelessly utilizable resources 200 may be a small form factor (SFF) device such as a handheld computing device (e.g., personal computer (PC)). A degree of performance that can be often provided by the SSF device can be relatively low due to its limited size and volume. Further, the SSF device may lack a number of channels by which expansion cards such as a high-performance video card can be added. Accordingly, providing a mechanism to wirelessly add a high-performance video card such as the apparatus 200-1 to the SSF device can provide benefits such as performing, at the SSF device, memory-intensive operations (e.g., memory intensive games and/or high quality video associated with a high degree of resolutions and/or frame rates), which would have not been properly performed at the SSF device absent the wirelessly utilizable resources.

In a number of embodiments, the apparatus 200-1 may be wirelessly utilized via a device-to-device communication technology, for example, by the wirelessly utilizable resources 200 as shown in FIG. 2. For example, as illustrated in connection with FIG. 1, the device-to-device communication technology can operate in higher frequency portion of the wireless spectrum, including an UHF, SHF, EHF and/or THF band, as defined according to the ITU. However, embodiments are not so limited. For example, other network communication technologies of a device-to-device communication technology may be employed within the system 223. As an example, the apparatus 200-1 may communicate with at least one of the wirelessly utilizable resources 200 via a different type of device-to-device communication technology such as a Bluetooth, Zigbee, and/or other types of device-to-device communication technologies.

As shown in FIG. 2, the apparatus 200-1 may be wirelessly utilized by the wirelessly utilizable resource 200-4 via the base station 225. As an example, a communication technology that can be utilized between the wirelessly utilizable resource 200-4 and the apparatus 200-1 may be a cellular telecommunication technology. In a number of embodiments, the cellular telecommunication technology that can be utilized for communicating between the wirelessly utilizable resource 200-4 and the apparatus 200-1 can include a 5G cellular telecommunication technology that operates in at least one of a number of frequency bands including the UHF, SHF, EHF, and/or THF.

The term "base station" may be used in the context of mobile telephony, wireless computer networking and/or other wireless communications. As an example, a base station 225 may include a GPS receiver at a known position, while in wireless communications it may include a transceiver connecting a number of other devices to one another and/or to a wider area. As an example, in mobile telephony, a base station 225 may provide a connection between mobile phones and the wider telephone network. As an example, in a computing network, a base station 322 may include a transceiver acting as a router for electrical components (e.g., memory resource 101 and processing resource 108 in FIG. 1) in a network, possibly connecting them to a WAN, WLAN, the Internet, and/or the cloud. For wireless networking, a base station 225 may include a radio transceiver that may serve as a hub of a local wireless network. As an example, a base station 225 also may be a gateway between a wired network and the wireless network. As an example, a base station 225 may be a wireless communications station installed at a fixed location.

In a number of embodiments, the apparatus 200-1 may utilize the same network protocol and same transceiver (e.g., RF transceiver) for a device-to-device communication technology (e.g., 5G device-to-device communication technology) as well as a cellular telecommunication technology (e.g., 5G cellular telecommunication technology), as described in connection with FIG. 1. As an example, the apparatus 200-1 may utilize the same network protocol in communicating with the wirelessly utilizable resource 200-4 (e.g., via a cellular telecommunication technology through the base station 225) as well as with the wirelessly utilizable resources 200 (e.g., via a device-to-device communication technology).

In a number of embodiments, various types of network protocols may be utilized for communicating data within the system 223 (e.g., among the wirelessly utilizable resources 200, between the wirelessly utilizable resources 200, between the wirelessly utilizable resources 200 and the base station 225, etc.). The various types of network protocols may include the time-division multiple access (TDMA), code-division multiple access (CDMA), space-division multiple access (SDMA), frequency division multiple access (FDMA), orthogonal FDMA (OFDMA), single-carrier (SC)-FDMA, and/or non-orthogonal multiple access (NOMA), although embodiments are not so limited.

In some embodiments, cellular telecommunication technologies (e.g., between the apparatus 200-1 and the wirelessly utilizable resource 200-4) may be performed via (e.g., include) a NOMA. As used herein, the NOMA refers to a network protocol that separates signals according to a power domain. For example, signals may be received (e.g., from the user) in an intentionally-introduced mutual interference and can be separated from each other according to differences on their power levels. As such, the signals received and to be processed pursuant to the NOMA may be non-orthogonal in time, frequency, and/or code, as compared to those orthogonal multiple-access (OMA) schemes, in which different users are allocated according to orthogonal resources, either in time, frequency, and/or code domain. Accordingly, utilizing a non-orthogonal network protocols such as the NOMA may provide benefits such as reduced latencies associated with separating users based on factors other than power domain, which may enable massive Multiple Input Multiple Output (MIMO).

In a number of embodiments, the apparatus 200-1 may be utilized by the wirelessly utilizable resources 200 at a discrete time. For example, the apparatus 200-1 may be utilized by the wirelessly utilizable resource 200-3 during a subsequent period of a particular period during which the apparatus 200-1 was, for example, utilized by the wirelessly utilizable resource 200-2. As such, the apparatus 200-1 may be utilized by each of the wirelessly utilizable resources 200 at different times (e.g., non-overlapping time periods). However, embodiments are not so limited. For example, the apparatus 200-1 may be simultaneously utilized by the wirelessly utilizable resources 200. As an example, the apparatus 200-1 may be physically and/or logically partitioned such that the partitioned portions may be simultaneously utilized by the wirelessly utilizable resources 200.

Figure 3:
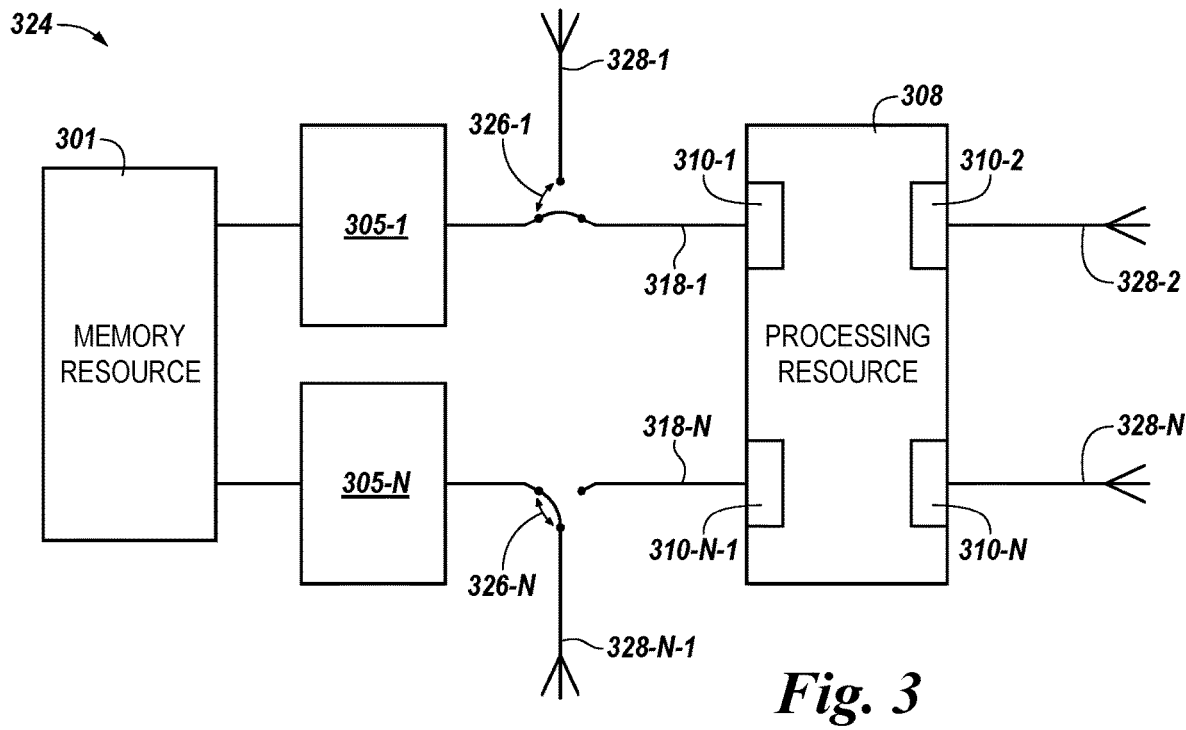
FIG. 3 is a diagram of an apparatus in accordance with a number of embodiments of the present disclosure.

FIG. 3 is a diagram of an apparatus 324 in accordance with a number of embodiments of the present disclosure.

As shown in FIG. 3, apparatus 324 includes a memory resource 301, processing resource 308 and a number of channels 305-1, 305-2 . . . , 305-N coupled to memory devices (e.g., memory devices 103-1, 103-2 . . . , 103-N in FIG. 1). The processing resource 308 can include a controller 310. The controller 310 is illustrated as being formed from a plurality of sections 310-1, 310-2, . . . , 310-N, although the controller 310 can be formed as a single component, as shown in FIG. 1. As described further herein, circuitry 318, a number of switches 326-1, 326-2 . . . , 326-N, and/or the controller 310 can be coupled to a number of resource transceivers 328-1, 328-2, . . . , 328-N-1 of the transceiver (e.g., transceiver 120 in FIG. 1) to transmit access requests, receive access to one or more wireless memory resources, receive access requests and/or enable access to the one or more memory resources.

Controller section 310-1 can be selectably coupled via I/O line 318-1 of the bus (e.g., bus 118 in FIG. 1) to the channel 305-1. A command can be issued from the processing resource 308 related to an operation to be directed to a memory resource (e.g., memory resource 101 in FIG. 1) coupled to the channel 305-1 and selectably coupled to the I/O line 318-1. The command can enable access of the memory resource by the processing resource 308. Alternatively or in addition, I/O line 318-1 can enable the wireless processing resource access to the memory resource in response to a request by the wireless processing resource. The wireless processing resource can use the memory resource to improve performance of the wireless processing resource, for example.

The processing resource 308 via controller section 310-1 can selectably determine whether I/O line 318-1 is configured to enable the processing resource 308 access to the memory resource (e.g., memory resource 101 in FIG. 1) or enable the wireless processing resource access to the memory resource by controlling switch 326-1. The controller section 310-1 can direct switch 326-1 to open to disconnect channel 305-1 from controller section 310-1 while connecting a portion of the I/O line 318-1 to resource transceiver 328-1 to enable the wireless processing resource to access the memory resource via I/O line 318-1 and channel 305-1. The controller section 310-1 can also direct switch 326-1 to close to disconnect resource transceiver 328-1 from channel 305-1 while connecting a portion of the I/O line 318-1 to the processing resource 308 to enable the processing resource 308 to access the memory resource via I/O line 318-1 and channel 305-1.

The processing resource 308 can request and receive access to a wireless memory resource via the transceiver 310. For example, the controller section 310-2 can request access and receive access to a wireless memory resource via resource transceiver 328-2.

Figure 4:
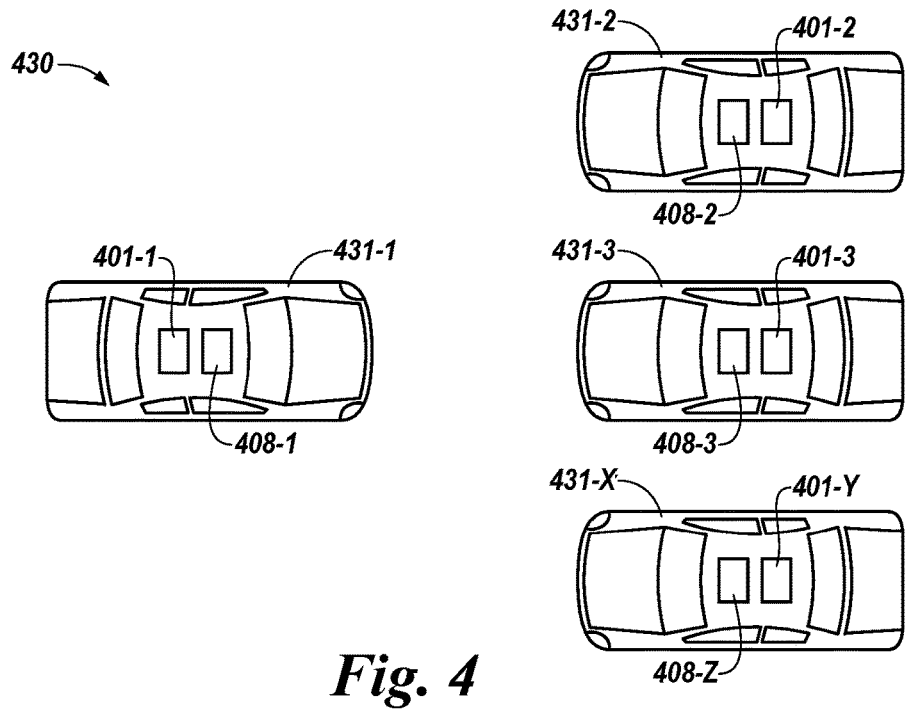
FIG. 4 is a diagram of a number of vehicles in accordance with a number of embodiments of the present disclosure.

FIG. 4 is a diagram 430 of a number of vehicles 431-1, 431-2, . . . , 431-X in accordance with a number of embodiments of the present disclosure.

As shown in FIG. 4, diagram 430 includes a number of vehicles 431-1, 431-2, . . . , 431-X including memory resources 401-1, 401-2, . . . , 401-Y and processing resources 408-1, 408-2, . . . , 408-Z.

In a number of embodiments, a first vehicle 431-1 can be configured to determine that a processing capability or a memory capacity, or both, at the first vehicle 431-1 is insufficient to perform a processing operation at the first vehicle 431-1. The first vehicle 431-1 can identify additional processing resources or additional memory capacity, or both, at a second vehicle 431-2 that is in wireless communication with the first vehicle 431-1 based at least in part on determining that the processing capability or the memory capacity, or both, at the first vehicle 431-1 is insufficient. In some examples, the first vehicle 431-1 can perform the processing operation at the first vehicle 431-1 using the additional processing resources or the additional memory capacity, or both.

The first vehicle 431-1 can be an automobile, an unmanned aerial vehicle, an aircraft, a train, or a watercraft, for example. In some examples, the second vehicle 431-2 can be an unmanned aerial vehicle, an aircraft, a train, or a watercraft. The first vehicle 431-1 can use resources of the second vehicle 431-2 and/or use additional resources of a terrestrial device, for example.

In some embodiments, the first vehicle 431-1 can include a first memory resource 401-1 coupled to a first processing resource 408-1. The first processing resource 408-1 can be configured to request access to a second memory resource 401-2 from a second processing resource 408-2. The second memory resource 401-2 and the second processing resource 408-2 can be coupled to each other and to a second vehicle 431-2. The first processing resource 408-1 can receive access from the second processing resource 408-2 to the second memory resource 401-2. The first processing resource 408-1 can access the second memory resource 401-2 while performing operations on data.

The number of vehicles 431-1, 431-2, . . . , 431-X may each include a transceiver (e.g., transceiver 120 in FIG. 1). For example, the request to use the additional processing resource or the additional memory capacity, or both can be sent from the first processing resource 408-1 using a first transceiver coupled to the first vehicle 431-1. In some examples, the request for the first vehicle 431-1 to access the additional processing resources or memory capacity, or both can be transmitted to a based station and the indication that the additional processing resources or the additional memory capacity is available for access is received from the base station.

The first vehicle 431-1 can receive an indication that the additional processing resources or the additional memory capacity, or both, is available for access by the first vehicle 431-1 and the processing operation at the first vehicle 431-1 can be performed based on receiving the indication. The access to the second memory resource 401-2 of the second vehicle 431-2 or the access to use the additional processing resource or the additional memory capacity, or both can be received by the transceiver. In some examples, the transceiver can be a radio frequency (RF) transceiver.

Identifying additional processing resources or additional memory capacity, or both, at the second vehicle 431-2 can include the first vehicle 431-1 querying the second vehicle 431-2 for the additional processing resources or the additional memory capacity, or both. The first vehicle 431-1 can transmit a request for the first vehicle 431-1 to access the additional processing resources or memory capacity, or both, at the second vehicle 431-2. In some examples, the request can also include a query for memory availability of the second memory resource 401-2. The request can also include an address of the first processing resource 408-1 of the first vehicle 431-1.

The first vehicle 431-1 can identify additional processing resources or additional memory capacity, or both, at the second vehicle 431-2 in response to the second vehicle 431-2 being the closest vehicle in proximity to the first vehicle 431-1. For example, the first processing resource 408-1 can request access to the second memory resource 401-2 in response to the second memory resource 401-2 being the closest memory resource in proximity to the first processing resource 408-1.

In some examples, the first vehicle 431-1 can perform a processing operation using additional processing resources or additional memory capacity, or both, at the second vehicle 431-2 in response to the second vehicle 431-2 having a threshold amount of the additional processing resources or a threshold amount of the additional memory capacity, or both. For example, the first processing resource 408-1 can request access to the second memory resource 401-2 in response to the second memory resource 401-2 having a threshold amount of memory. The first processing resource 408-1 can also request access to the second memory resource 401-2 in response to the second memory resource 401-2 having the amount of memory needed for the apparatus to perform an operation.

A number of memory resources 401-1, 401-2, . . . , 401-Y of a number of vehicles 431-1, 431-2, . . . , 431-X can be queried by the first processing resource 408-1 of the first vehicle 431-1. The first processing resource 408-1 of the first vehicle 431-1 can query a third processing resource 408-3 and/or a third memory resource 401-3 of a third vehicle 431-3. The first vehicle 431-1 can query the third vehicle 431-3 for additional processing resources or additional memory capacity, or both. For example, the first processing resource 408-1 can query the third processing resource 408-3 for an amount of available memory a third memory resource 401-3 has.

The first processing resource 408-1 can query the third processing resource 408-3 in response to the second memory resource 401-2 having less memory available than the amount of memory needed by the first processing resource 408-1 to perform an operation. In some examples, the first processing resource 408-1 can use the first memory resource 401-1, the second memory resource 401-2, and/or the third memory resource 401-3 to perform the operation.

In some embodiments, a processing resource can relinquish access to a memory resource. For example, the first processing resource 408-1 can relinquish access to the second memory resource 401-2. The first processing resource 408-1 can relinquish access to the second memory resource 401-2 in response to completing an operation on data. In some examples, the first processing resource 408-1 can relinquish access to the second memory resource 401-2 in response to accessing another memory resource. Also, the first processing resource 408-1 can relinquish access to the second memory resource 401-2 in response to the second vehicle 431-2 requesting the second memory resource 401-2.

The second memory resource 401-2 in the second vehicle 431-2 can be a wireless memory when accessed by, for example, the first processing resource 408-1 in the first vehicle 431-1. The number of memory resources 401-1, 401-2 . . . , 401-Y can be queried and/or used by an active vehicle. A number of memory resource 401-2, 401-3, . . . , 401-Y can be from and/or connected to idle vehicles. For example, the first vehicle 431-1 can be in use (e.g., driving and/or turned on). The first vehicle 431-1 can use the number of memory resource 401-2, 401-3, . . . , 401-Y that are not in use (e.g., parked and/or turned off).

A number of memory resources 401-1, 401-2, . . . , 401-Y can be used by the first vehicle 431-1 in response to the number of memory resources 401-1, 401-2 . . . , 401-Y being within a particular proximity to the first vehicle 431-1. In some examples, one of the number of memory resources 401-1, 401-2 . . . , 401-Y do not have enough available memory for the first processing resource 408-1 to complete an operation. As a result, a number of memory resources 401-1, 401-2, . . . , 401-Y can each grant access to the first processing resource 408-1 to pool the number of memory resources 401-1, 401-2, . . . , 401-Y for the processing resource 408-1 to have enough memory to complete the operation.

Figure 5:
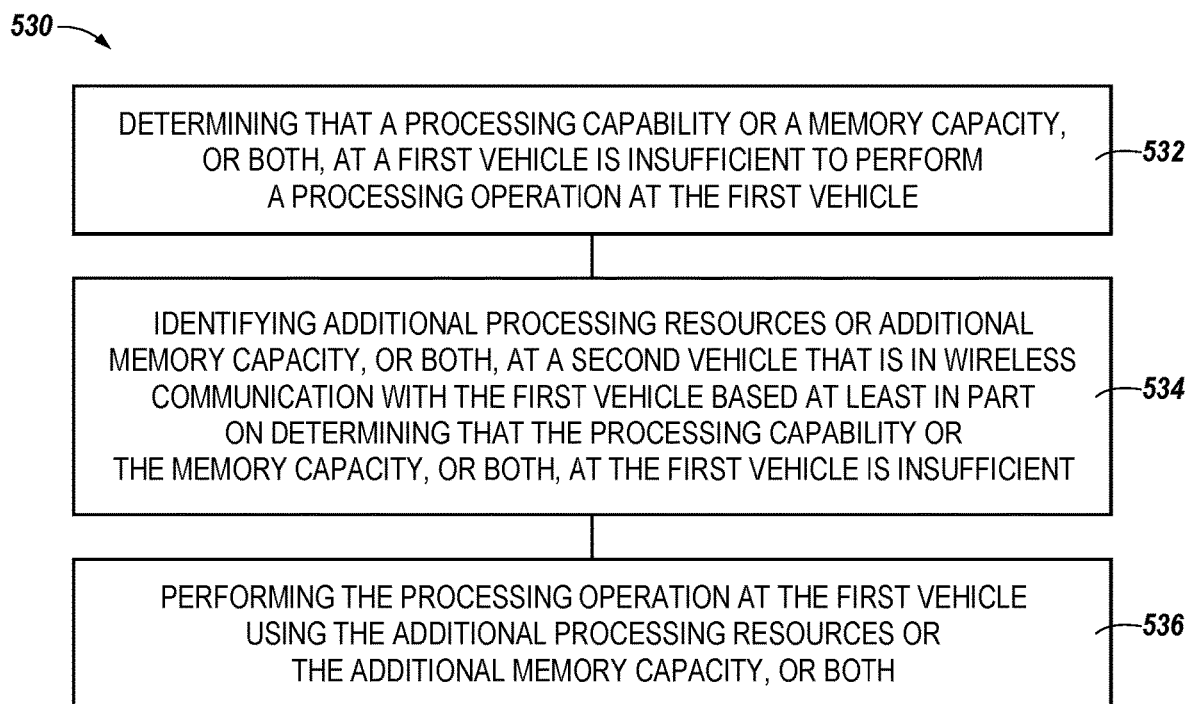
FIG. 5 is a flow chart illustrating an example of a method for wirelessly utilizing resources in accordance with a number of embodiments of the present disclosure.

FIG. 5 is a flow chart illustrating an example of a method for wirelessly utilizing resources in accordance with a number of embodiments of the present disclosure.

At block 532, the method 530 may include determining that a processing capability or a memory capacity, or both, at a first vehicle (e.g., first vehicle 431-1 in FIG. 4) is insufficient to perform a processing operation at the first vehicle.

In some embodiments, the method 530 may further include, at block 534, identifying additional processing resources or additional memory capacity, or both, at a second vehicle (e.g., second vehicle 431-2 in FIG. 4) that is in wireless communication with the first vehicle (e.g., first vehicle 431-1 in FIG. 4) based at least in part on determining that the processing capability or the memory capacity, or both, at the first vehicle is insufficient.

At block 536, the method 530 may include performing the processing operation at the first vehicle (e.g., first vehicle 431-1 in FIG. 4) using the additional processing resources or the additional memory capacity, or both.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising: closing a switch to disconnect a first transceiver from a memory resource and couple the memory resource to a processing resource of a first wirelessly utilizable resource; and accessing additional memory capacity from a second wirelessly utilizable resource via a second transceiver of the first wirelessly utilizable resource.

2. The method of claim 1, comprising accessing additional processing resources from the second wirelessly utilizable resource via the second transceiver.

3. The method of claim 2, comprising accessing the additional processing resources from the second wirelessly utilizable resource via the second transceiver in response to determining that the processing capability at the first wirelessly utilizable resource is insufficient to perform a processing operation.

4. The method of claim 1, comprising accessing the additional memory capacity from the second wirelessly utilizable resource via the second transceiver in response to determining that a memory capacity at the first wirelessly utilizable resource is insufficient to perform a processing operation.

5. The method of claim 4, comprising identifying the additional memory capacity based at least in part on determining that the memory capacity at the first wirelessly utilizable resource is insufficient to perform the processing operation.

6. The method of claim 5, comprising identifying the additional memory capacity includes querying the second wirelessly utilizable resource for the additional memory capacity.

7. The method of claim 5, comprising identifying the additional memory capacity in response to the second wirelessly utilizable resource being closest in proximity.

8. The method of claim 1, comprising performing a processing operation using the additional memory capacity in response to accessing the additional memory capacity.

9. The method of claim 8, comprising performing the processing operation using the additional memory capacity in response to the additional memory capacity having a threshold amount of additional memory capacity.

10. The method of claim 1, comprising sending a request to access the additional memory capacity using the second transceiver.

11. An apparatus, comprising:
a switch;

a first transceiver;
a second transceiver;
a memory resource configured to store executable instructions; and
a processing resource configured to execute the executable instructions to:
 close the switch to disconnect the first transceiver from the memory resource;
 couple the memory resource to the processing resource; and
 access additional memory capacity from a wirelessly utilizable resource via the second transceiver.

12. The apparatus of claim 11, wherein the apparatus is a vehicle.

13. The apparatus of claim 11, wherein at least one of: the first transceiver or the second transceiver is a radio frequency (RF) transceiver.

14. The apparatus of claim 11, wherein the processing resource is configured to query a second wirelessly utilizable resource for the additional memory capacity.

15. The apparatus of claim 14, wherein the query includes an address of the apparatus.

16. A system, comprising:
a first wirelessly utilizable resource; and
a second wirelessly utilizable resource comprising:
 a first transceiver;
 a second transceiver;
 a memory resource configured to store executable instructions; and
 a processing resource configured to execute the executable instructions to:
  disconnect the first transceiver from the memory resource;
  couple the memory resource to the processing resource; and
  access additional memory capacity from the first wirelessly utilizable resource via the second transceiver.

17. The system of claim 16, wherein the second wirelessly utilizable resource comprises a switch.

18. The system of claim 17, wherein the switch is configured to close to disconnect the first transceiver from the memory resource.

19. The system of claim 17, wherein the switch is configured to close to couple the memory resource to the processing resource.

20. The system of claim 17, wherein the switch is configured to open to couple the first transceiver to a channel.

* * * * *